(12) United States Patent
Wu (10) Patent No.: US 7,859,465 B2
(45) Date of Patent: Dec. 28, 2010

(54) SYSTEM AND METHOD FOR MULTILATERATING A POSITION OF A TARGET USING MOBILE REMOTE RECEIVING UNITS

(75) Inventor: Haoyun Wu, Manlius, NY (US)

(73) Assignee: Sensis Corporation, East Syracuse, NY (US)

( * ) Notice: Subject to any disclaimer, the term of this patent is extended or adjusted under 35 U.S.C. 154(b) by 0 days.

(21) Appl. No.: 12/639,340

(22) Filed: Dec. 16, 2009

(65) Prior Publication Data

US 2010/0091924 A1 Apr. 15, 2010

Related U.S. Application Data (62) Division of application No. 11/736,230, filed on Apr. 17, 2007.

(60) Provisional application No. 60/793,892, filed on Apr. 21, 2006, provisional application No. 60/834,594, filed on Aug. 1, 2006.

(51) Int. Cl.
*G01S 3/02* (2006.01)
(52) U.S. Cl. ..................................... 342/465
(58) Field of Classification Search ................ 342/465

See application file for complete search history.

(56) References Cited

U.S. PATENT DOCUMENTS

| 5,317,323 | A | 5/1994 | Kennedy et al. |
| 6,933,888 | B1 | 8/2005 | Schiffmiller et al. |
| 7,333,394 | B2 * | 2/2008 | Basilico ................ 367/124 |
| 2003/0130793 | A1 | 7/2003 | Patwari et al. |

FOREIGN PATENT DOCUMENTS

| EP | 0 964 265 | 12/1999 |
| EP | 1 289 172 | 3/2003 |
| WO | 02/071093 | 9/2002 |

* cited by examiner

*Primary Examiner*—Thomas H Tarcza
*Assistant Examiner*—Harry Liu
(74) *Attorney, Agent, or Firm*—Burr & Brown (57) ABSTRACT

A method of multilaterating the position of a target, including the steps of deploying a plurality of time synchronized receiving units in a network that allows the receiving units to communicate with a central processor; receiving a target signal from the target at each receiving unit; determining a time of arrival for the target signal at each receiving unit; determining position data for each receiving unit at the time when the target signal is received at each respective receiving unit; and using the time of arrival and position data for each receiving unit to determine the position of the target by multilateration. A system for carrying out the method is also disclosed.

12 Claims, 6 Drawing Sheets

Short Probe Message 40:

| MSG ID = 0 | Initiator ID | Number of Recipients | Recipient 1 ID | Recipient 2 ID | ... | Recipient N ID |
|---|---|---|---|---|---|---|

Short Probe Reply Message 41:

| MSG ID = 1 | Initiator ID | Probee ID | SPM Receive Local Timestamp | SPRM Transmit Local Timestamp | Local Timestamp Confidence Level |
|---|---|---|---|---|---|

Short U-Probe Message 42:

| MSG ID = 2 | Initiator ID | Number of Recipients | Recipient 1 ID | Recipient 2 ID | ... | Recipient N ID |
|---|---|---|---|---|---|---|

Short U-Probe Probe Message 43:

| MSG ID = 3 | Initiator ID | Prober ID | SUPM Receive Local Timestamp | SUPPM Transmit Local Timestamp | Local Timestamp Confidence Level |
|---|---|---|---|---|---|

Short U-Probe Reply Message 44:

| MSG ID = 4 | Initiator ID | Prober ID | SUPPM Receive Local Timestamp | SUPRM Transmit Local Timestamp | Local Timestamp Confidence Level |
|---|---|---|---|---|---|

Short Probe Message 40:

| MSG ID = 0 | Initiator ID | Number of Recipients | Recipient 1 ID | Recipient 2 ID | ... | Recipient N ID |
|---|---|---|---|---|---|---|

Short Probe Reply Message 41:

| MSG ID = 1 | Initiator ID | Probee ID | SPM Receive Local Timestamp | SPRM Transmit Local Timestamp | Local Timestamp Confidence Level |
|---|---|---|---|---|---|

Short U-Probe Message 42:

| MSG ID = 2 | Initiator ID | Number of Recipients | Recipient 1 ID | Recipient 2 ID | ... | Recipient N ID |
|---|---|---|---|---|---|---|

Short U-Probe Probe Message 43:

| MSG ID = 3 | Initiator ID | Prober ID | SUPM Receive Local Timestamp | SUPPM Transmit Local Timestamp | Local Timestamp Confidence Level |
|---|---|---|---|---|---|

Short U-Probe Reply Message 44:

| MSG ID = 4 | Initiator ID | Prober ID | SUPPM Receive Local Timestamp | SUPRM Transmit Local Timestamp | Local Timestamp Confidence Level |
|---|---|---|---|---|---|

Fig. 5

Long Probe Message 50:

| MSG ID = 5 | Initiator ID | Position Data Format | Initiator Position | Local Position Confidence Level | Number of Recipients | Recipient 1 ID | Recipient 2 ID | ... | Recipient N ID |
|---|---|---|---|---|---|---|---|---|---|

Long Probe Reply Message 51:

| MSG ID = 6 | Initiator ID | Probee ID | LPM Receive Local Timestamp | LPRM Transmit Local Timestamp | Local Timestamp Confidence Level | Position Data Format | Replier Position | Local Position Confidence Level |
|---|---|---|---|---|---|---|---|---|

Long U-Probe Message 52:

| MSG ID = 7 | Initiator ID | Number of Recipients | Recipient 1 ID | Recipient 2 ID | ... | Recipient N ID |
|---|---|---|---|---|---|---|

Long U-Probe Probe Message 53:

| MSG ID = 8 | Initiator ID | Prober ID | LUPM Receive Local Timestamp | LUPPM Transmit Local Timestamp | Local Timestamp Confidence Level | Position Data Format | Prober Position | Local Position Confidence Level |
|---|---|---|---|---|---|---|---|---|

Long U-Probe Reply Message 54:

| MSG ID = 9 | Initiator / Probee ID | Prober ID | LUPPM Receive Local Timestamp | LUPRM Transmit Local Timestamp | Local Timestamp Confidence Level | Position Data Format | Initiator / Probee Position | Local Position Confidence Level |
|---|---|---|---|---|---|---|---|---|

Extended Probe Message 60:

| MSG ID = 10 | Initiator ID | Position Data Format | Initiator Position | Local Position Confidence Level | Initiator Velocity | Local Velocity Confidence Level | Number of Recipients | Recipient 1 ID | Recipient 2 ID | ... | Recipient N ID |
|---|---|---|---|---|---|---|---|---|---|---|---|

Extended Probe Reply Message 61:

| MSG ID = 11 | Initiator ID | Probee ID | LPM Receive Local Timestamp | LPRM Transmit Local Timestamp | Local Timestamp Confidence Level | Position Data Format | Replier Position | Local Position Confidence Level | Replier Velocity | Local Velocity Confidence Level |
|---|---|---|---|---|---|---|---|---|---|---|

Extended U-Probe Message 62:

| MSG ID = 12 | Initiator ID | Number of Recipients | Recipient 1 ID | Recipient 2 ID | ... | Recipient N ID |
|---|---|---|---|---|---|---|

Extended U-Probe Probe Message 63:

| MSG ID = 13 | Initiator ID | Prober ID | LUPM Receive Local Timestamp | LUPPM Transmit Local Timestamp | Local Timestamp Confidence Level | Position Data Format | Prober Position | Local Position Confidence Level | Prober Velocity and Acceleration | Local Velocity and Acceleration Confidence Level |
|---|---|---|---|---|---|---|---|---|---|---|

Extended U-Probe Reply Message 64:

| MSG ID = 14 | Initiator / Probee ID | Prober ID | LUPPM Receive Local Timestamp | LUPRM Transmit Local Timestamp | Local Timestamp Confidence Level | Position Data Format | Initiator / Probee Position | Local Position Confidence Level | Initiator / Probee Velocity and Acceleration | Local Velocity and Acceleration Confidence Level |
|---|---|---|---|---|---|---|---|---|---|---|

Fig. 11

| MSG ID (message identifier) | Description |
|---|---|
| 0 | Short Probe message (SPM) |
| 1 | Short Probe Reply message (SPR) |
| 2 | Short U-Probe message (SUPM) |
| 3 | Short U-Probe Probe message (SUPPM) |
| 4 | Short U-Probe Reply message (SUPRM) |
| 5 | Long Probe message (LPM) |
| 6 | Long Probe Reply message (LPRM) |
| 7 | Long U-Probe message (LUPM) |
| 8 | Long U-Probe Probe message (LUPPM) |
| 9 | Long U-Probe Reply message (LUPRM) |
| 10 | Extended Probe message (LPM) |
| 11 | Extended Probe Reply message (LPRM) |
| 12 | Extended U-Probe message (LUPM) |
| 13 | Extended U-Probe Probe message (LUPPM) |
| 14 | Extended U-Probe Reply message (LUPRM) |

| Position Data Format | Description |
|---|---|
| 0 | WGS-84 Latitude (degree), Longitude(degree), Altitude (meter) |
| 1 | Cartesian Coordinate North, East, Up in meters relative to the Message Recipient |
| 2 | Cartesian Coordinate North, East, Up in meters relative to the system reference |
| 3 | Range (meter), Azimuth (degree clockwise from North), and Elevation (meter) to the Message Recipient |
| 4 | Range (meter), Azimuth (degree clockwise from North), and Elevation (meter) to the system reference |

SYSTEM AND METHOD FOR MULTILATERATING A POSITION OF A TARGET USING MOBILE REMOTE RECEIVING UNITS

CROSS REFERENCE TO RELATED APPLICATIONS

This application is a divisional application of U.S. application Ser. No. 11/736,230, filed Apr. 17, 2007, and claims the benefit of U.S. Provisional Application Ser. No. 60/793,892, filed Apr. 21, 2006, and U.S. Provisional Application Ser. No. 60/834,594, filed Aug. 1, 2006, the entireties of which are incorporated herein by reference.

FIELD OF THE INVENTION

The present invention relates to systems and methods for multilaterating a position of a target using mobile remote receiving units (RUs). In particular the systems and methods are applied to the field of surveillance and identification of mobile vehicles, surface or airborne, which emit deterministic signals in common radio environments. The present invention provides techniques for determining either an earth coordinate position or a relative position for a target emitter, for example.

BACKGROUND OF THE INVENTION

Multilateration is a cooperative surveillance technique used to locate the source of a radio transmission based upon differences in time of arrival (DTOA) and/or Time-of-Arrivals (TOA) of a radio signal received at multiple receivers of known position. Signal arriving time measurements are often referred to as Time-of-Arrival (TOA) measurements and the difference between two TOAs is often referred to as a Difference-Time-of-Arrival (DTOA) measurement. Existing systems for determining locations of radio signal emitters based on signal TOA and DTOA are generally described as multilateration (MLAT) systems.

MLAT systems have been deployed to locate aircraft, for example, using an aircraft-generated signal such as a signal from an Air Traffic Control Radar Beacon System (AT-CRBS), a Mode-S transponder system, or an Automatic Dependent Surveillance Broadcast (ADS-B) system. In such systems, a plurality of sensors or remote units (RUs) measure the signal times of arrival (TOA) at carefully sited and surveyed locations to provide the coverage necessary for emitters in a predefined region (e.g., around an airport). Each RU utilizes a clock that is synchronized to a common time base (e.g., global positioning system (GPS) time may be used as the common time base). When a target-generated signal is received at an RU, the received signal is time stamped and forwarded to a central processor or other designated location via a radio frequency (RF) or a hard-wire network, where the received signal and time stamp information gathered from all RUs is used to compute the origin of the transmission based upon the differences in propagation time of the target signal received at multiple RUs. More specifically, the RU-measured TOAs are routed through data links or other communication networks to a centralized processor, where DTOA calculations and position estimations are performed.

In one instance, the measurement of range defines a mathematical sphere on which the transmitter is located, with the receiving RU located at the center of the sphere. The DTOA between a pair of the measurements of signal TOA define a hyperboloid on which the transmitter is located, with the RUs located at the two foci of the hyperboloid. The difference between signal TOA and the signal transmitting time defines the range to the target, because distance and time are related by the speed of light (a constant). However, to obtain direct traveling time measurements, RUs and emitters are required to be synchronized. One method able to avoid the synchronization requirement between emitters and RUs is by calculating the range from the round-trip traveling time minus the expected delays. The round-trip technique requires cooperation from emitters and requires RUs to actively interrogate emitters. When active interrogation is undesired and is not performed, the solutions are based on DTOA measurements. The underlying mathematical problem of the multilateration system is the problem of solving the intersection of the measurement hyperboloids and/or spheres, which is equivalent to the problem of solving the DTOA and/or range equations, given exact RU locations and synchronized RU clocks.

Figure 1:
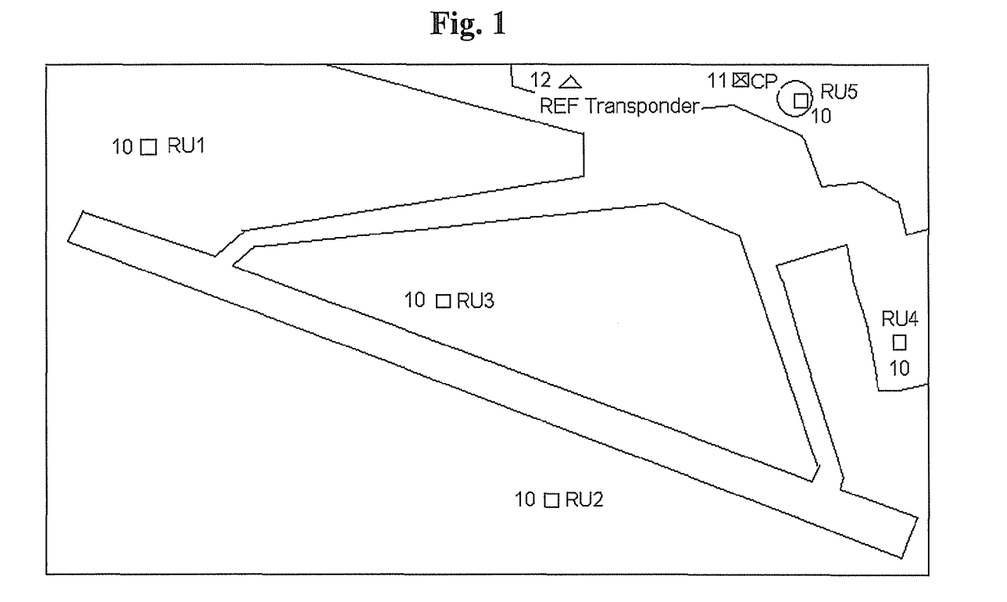
FIG. 1 is a diagram illustrating the configuration of a conventional MLAT system with stationary, surveyed remote units (RUs)

As with any detection and location system, there are errors associated with a multilateration system. For example, each RU will have errors based on RU inherent properties such as clock drift and system processing latency. Prior art methods for reducing the clock drift error have utilized a reference transmitter to time synchronize the RUs in the multilateration system. A reference transmitter is located at a known position that is visible to each RU. Referring to FIG. 1, for example, the reference transponder 12 broadcasts a signal and the actual time of arrival (TOA) of the reference transponder signal is recorded and reported by each fixed surveyed RU 10 (RU1-RU3) to a central processor 11. In addition, since the position of each RU 10 is known and the location of the reference transponder 12 is known, the expected time of arrival (TOA) of the reference transponder signal can be calculated.

The time of transmission from the reference transponder plus the propagation times to the individual RUs may then be compared to the actual TOA at the RUs. For multilateration calculations depending on the differences in time of arrival, correction of the DTOA is sufficient to correct the system. The actual time differences between TOAs are compared to the calculated values and corrections are made to each RU to adjust for the errors in DTOA. Any subsequent signals received are corrected with an individual correction time for each RU thereby calibrating the system of RUs used for multilateration. These corrections are made prior to multilateration calculations. A system using this reference transponder calibration technique is described in U.S. Pat. No. 5,424,746 to Schwab.

One notable limitation for using the known multilateration techniques is that each RU 10 and the reference transponder 12 are required to be physically located at carefully surveyed locations. As described above, to determine emitter locations, multilateration systems require prior knowledge of RU locations. For existing multilateration systems, RU 10 locations are precisely surveyed prior to operation and once the survey is complete the RUs are kept stationary. Relocating or moving an operating RU is unlikely and in any event must be done offline since the uncertainty incurred due to movement of the RU greatly degrades the overall position accuracy of the system. The immobility of the RUs limits such multilateration systems to applications where the RUs are stationary.

In emergency or disaster situations, the stationary RUs that are located at surveyed locations are frequently inoperable due to damage and/or lack of power. For example, government officials are often unable to re-open an airport for several days after a disaster (e.g., a hurricane), because the local surveillance systems are not functioning. The inability to provide sufficient surveillance to re-open an airport in turn creates a bottleneck slowing the flow of relief aid into the affected area. As disaster aid support requirements or terrestrial conditions change, having a multilateration system capable of operating without the need to use pre-surveyed RUs or even while the system's RUs are mobile (or are being reconfigured) would be very beneficial for disaster relief efforts, as well as in other situations.

Another notable limitation on using known multilateration techniques is the need for a reference transponder 12 that is located where the reference transponder has a clear view of each RU to time synchronize or calibrate the multilateration system.

For many advent applications in the fields such as law enforcement, emergency/disaster response, and on-demand or temporary-coverage services, it would be very helpful if unsurveyed RUs could be used, and even better would be a technique where the RUs are allowed to move while operating. In light of the above, there is a need for a system and method for monitoring the position of a target that does not require RUs to be stationary at known, carefully surveyed sites, and that can operate while the RUs are moving.

SUMMARY OF THE INVENTION

It is an object of the present invention to provide a system and method for determining the position of a target by multilateration, without requiring the use of stationary, pre-surveyed RUs.

In a preferred embodiment of the present invention, the method of multilaterating the position of a target includes the steps of: deploying a plurality of time synchronized receiving units in a network that allows the receiving units to communicate with a central processor; receiving a target signal from the target at each receiving unit; determining a time of arrival for the target signal at each receiving unit; determining position data for each receiving unit at the time when the target signal is received at each respective unit; and using the time of arrival and position data for each receiving unit to determine the position of the target by multilateration.

Each receiving unit determines its own position for the step of determining position data. Preferably each receiving unit determines its own earth coordinate position using a GPS receiver. Another aspect of this embodiment is that each receiving unit uses GPS signals for time synchronization.

In another embodiment of the present invention, at least one receiving unit includes a GPS receiver and one or more sensors (e.g., speedometer, magnetic compass, accelerometer, gyroscope, altimeter). The sensors detect the physical conditions of the receiving unit (e.g., its motion and trajectory relative to the previous position determined by the GPS receiver or other means). Another aspect of this embodiment is the receiving unit includes a Kalman filter that uses positions determined by the GPS receiver (or other means) and motion data supplied by the sensors to determine a smoothed receiving unit position. Yet another aspect of this embodiment is that the position derived from the GPS receiver (or other means) and motion data can be fed back to the GPS receiver and other GPS receivers co-located with the receiving unit to aid the GPS receivers with time synchronization.

In another embodiment of the present invention, a first receiving unit includes a GPS receiver to determine its own earth coordinate position, and the position data for each remaining receiving unit is determined relative to the first receiving unit. Another aspect of this embodiment is a first receiving unit includes a clock that uses GPS signals for time synchronization and each remaining receiving unit includes a clock that is synchronized to the clock of the first receiving unit. In this embodiment, each receiving unit determines its own position relative to at least another one of the receiving units, and the position of the target is determined relative to the positions of the receiving units.

In another embodiment of the present invention, at least one receiving unit is capable of determining the direction of arrival (DOA) of a target signal at a receiving unit, for example, where one receiving is equipped with a multi-sector antenna or antenna array, and the DOA data is used to assist the present invention in multilaterating the position of the target signal source. Another aspect of the invention is deploying relay stations to facilitate communication within the network. The relay stations are mobile surface or air units that do not receive the target signal from the target. In a preferred embodiment, the receiving units are non-surveyed, mobile surface or air units. In another embodiment, the network comprises a satellite communications link. In yet another embodiment, the network comprises a microwave communications link.

In a preferred embodiment of the present invention, the method of time synchronizing a plurality of receiving units in a multilateration system, includes the steps of: forming a communications network between the plurality of receiving units, the communications network supplying data between the receiving units and a central processor; transmitting a message from a first receiving unit to at least one other receiving unit to initiate time synchronization between a clock in the first receiving unit and a clock in the at least one other receiving unit; receiving, at the first receiving unit, a response message from the at least one other receiving unit; and transmitting a reply message from the first receiving unit to the at least one other receiving unit, wherein the reply message contains at least one of (i) a time of receipt of the response message at the first receiving unit, and (ii) a time of transmission of the reply message from the first receiving unit, whereby the at least one other receiving unit uses the reply message from the first receiving unit to synchronize the clock in the at least one other receiving unit to the clock in the first receiving unit. In one embodiment of the present invention, at least one of the messages contains a time quality indicator. In this embodiment, the method further includes the step of determining which receiving unit has a clock with a highest time quality indicator and synchronizing clocks to the clock of the receiving unit that has the highest time quality indicator.

In yet another embodiment of the present invention, the method of time synchronizing a plurality of receiving units in a multilateration system comprising the steps of: forming a communications network between the plurality of receiving units, the communications network supplying data between the receiving units and a central processor; transmitting a message from a second receiving unit to a first receiving unit; receiving, at the second receiving unit, a reply message from the first receiving unit, wherein the reply message contains at least one of (i) a time of receipt of the message at the first receiving unit, and (ii) a time of transmission of the reply message from the first receiving unit, whereby the second receiving unit uses the reply message from the first receiving unit to synchronize a clock in the second receiving unit with a clock in the first receiving unit. In one embodiment of the present invention, the method includes the step of determining whether the clock in the first receiving unit has a higher quality indicator than the clock in the second receiving unit before synchronizing the clock in the second receiving unit to the clock in the first receiving unit. After the clock in the second receiving unit is synchronized to the clock in the first receiving unit, the steps are repeated for a third receiving unit with respect to the second receiving unit.

In another embodiment of the present invention, the clock time quality indicator is implemented as the expected error covariance of clock time and the time synchronization between two receiving units is implemented in a form of clock time fusion. The resulting synchronized clock time is a linearly smoothed clock time between the two clock time values.

In one embodiment, the reply message contains the time of receipt of the message at the first receiving unit and the time of transmission of the reply message from the first receiving unit and after the clock in the second receiving unit is synchronized to the clock in the first receiving unit, the steps are repeated for a third receiving unit with respect to the second receiving unit.

In a further embodiment of the present invention, a method of multilaterating the position of a target, includes the steps of: deploying a plurality of time synchronized receiving units in a network that allows the receiving units to communicate with a central processor; equipping at least one receiving unit with a GPS receiver; transmitting signals between the receiving units to determine position data for each receiving unit; receiving a target signal from the target at each receiving unit; determining a time of arrival for the target signal at each receiving unit; and using the time of arrival and position data for each receiving unit to determine the position of the target by multilateration.

In this embodiment, each receiving unit is equipped with a GPS receiver so that position data can be determined for each receiving unit and the signals transmitted between the receiving units are used to determine range data between the receiving units, whereby the GPS position data for each receiving unit is supplemented by the range data to determine more precise position data for each receiving unit.

BRIEF DESCRIPTION OF THE DRAWINGS

For a fuller understanding of the nature and objects of the invention, reference should be made to the following detailed description of preferred modes of practicing the invention, read in connection with the accompanying drawings in which:

FIG. 4 is an example of the data content of a short probe message in one embodiment of the present invention;

FIG. 5 is an example of the data content of a long probe message in one embodiment of the present invention;

FIG. 10 is an example of the data content of extended format probe messages of one embodiment of the present invention;

FIG. 11 is an example of the message identifiers and position data formats used in the probe/u-probe messages of one embodiment of the present invention.

DETAILED DESCRIPTION OF THE INVENTION

The system and method of the present invention determine target location by signal processing measurements collected by mobile RUs that receive signals emitted from the target. While the prior art multilateration systems require the RUs and reference transponder to be stationary at carefully surveyed sites, the present invention allows the RUs to be mobile, and essentially eliminates the need for a reference transponder, at least in the traditional sense.

The present invention addresses three primary issues that allow the MLAT RUs to move during operation: (1) the ability to obtain a precise location for each RU "on the fly"; (2) the ability to maintain time synchronization among the RUs, even while the RUs are moving; and (3) the ability to establish and maintain a communications link between the RUs. The present invention addresses these issues by providing the RUs with the capability to self-survey, self-synchronize, and self-organize.

In accordance with one embodiment of the present invention, the RUs are capable of self-surveying and self-calibrating by equipping each RU with its own GPS receiver. As explained below, this allows the RUs to function without a site survey and while on the move.

Figure 2:
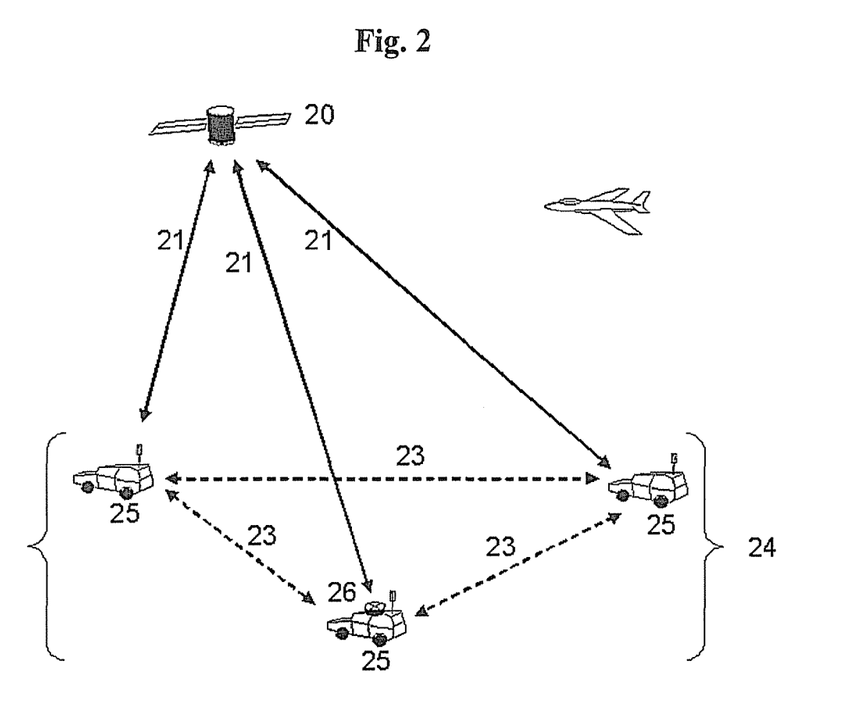
FIG. 2 is a diagram a mobile MLAT configuration using GPS receivers in one embodiment of the present invention.

FIG. 2 shows one example of this approach. Each mobile RU 25 is equipped with a Global Positioning System (GPS) receiver, and the system utilizes the periodic position and time outputs of the GPS receivers to determine the positions of the RUs, and uses the synchronization signals 21 received from the GPS satellites 20 (only one satellite is shown in FIG. 2) to time synchronize the RUs 25 relative to one another. GPS is an effective measure to synchronize mobile RUs 25 that are distributed over a wide area and/or separated by great distances. In fact, the mobile RUs 25 do not even have to be in sight of each other. Depending upon system requirements and the level of detection accuracy desired, the GPS receivers can range from standard GPS, Differential GPS, WAAS/LAAS GPS, carrier-phase GPS, civilian dual-band GPS, to military Selective Availability Anti-Spoofing Module (SAASM) GPS, and may operate with NAVSTAR, GLONASS, and/or the Galileo satellites. To be used in the present invention, however, the GPS receivers must be able to provide location reporting and time reporting functionalities in real time. To utilize GPS for RU 25 time synchronization, for example, the one pulse per second output of the GPS receiver can be used to discipline the local oscillator in RU 25 or the UTC time output from the GPS receiver can be used to synchronize the clock in RU 25 to standard time. Yet another method is to utilize common-view GPS time transfer techniques such as the algorithm depicted in D. W. Allan, M. A. Weiss, "Accurate time and Frequency Transfer during Common-View of a GPS Satellite," Proc. 34th Ann. Symp. on Frequency Control, 1980, 334-346 and The Science of Timekeeping, by David W. Allan, Neil Ashby, Clifford C. Hodge; Hewlett Packard Application Note 1289; 1997.

By equipping each RU 25 with its own GPS receiver, each RU 25 can determine its own position and transmit that information to a central processor 26 along with the TOA information for a particular target. A central processor 26, which could reside within one of the RUs 25, for example, will then know the GPS position of each RU 25 at the point in time when each RU 25 transmits TOA data about a particular target. The central processor 26, knowing the position of each reporting RU 25, can then, through traditional techniques, determine the position of the target through multilateration.

The TOA data from each RU 25 can be used in the manner described above, because the RUs 25 are time synchronized using the GPS signal. As an alternative, the mobile RUs 25 can be equipped with clocks that are periodically regulated and smoothed with GPS time. In addition, the GPS positions may be further processed by means of tacking techniques such as Kalman Filtering to achieve a higher resolution and accuracy.

Qualified GPS receivers are chosen such that they are able to produce position and time updates with a rate satisfying the required minimum localization accuracy, which is greatly influenced by the underlying maximum speed of the mobile RUs 25. A higher GPS position and time update rate are normally required for supporting faster RU motions and/or achieving higher localization accuracy.

Figure 3:
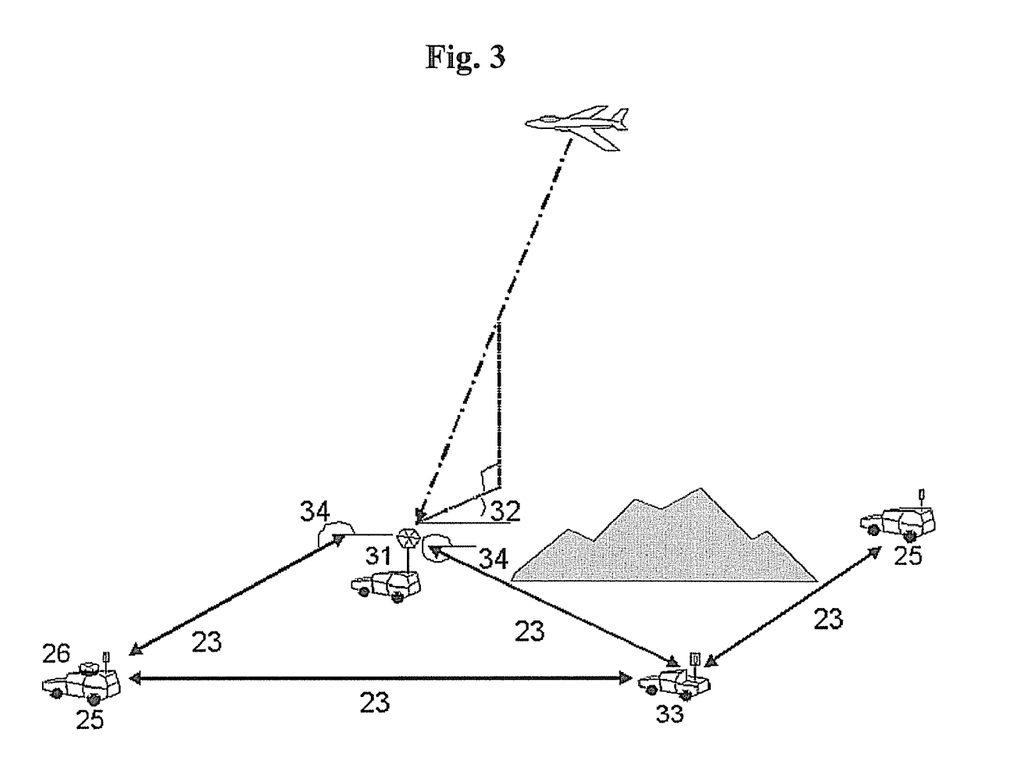
FIG. 3 is a diagram illustrating a mobile MLAT configuration of one embodiment of the present invention using a multi-sector antenna for direction of arrival (DOA) determination.

Referring to FIG. 3, in one embodiment of the present invention, at least one of the mobile RUs 25 is equipped with a multi-sector antenna or antenna array 31. In this embodiment, the multi-sector antenna or antenna array 31 equipped RU 25 reports the angle of arrival (AOA) or direction of arrival (DOA) 32 of the received emitter signal, from the target of unknown location, thereby increasing the accuracy of the emitter position computed by the mobile MLAT system. The DOA can be determined from the signal phase difference and/or signal strength difference received by multiple antennas (usually from two adjacent antennas with overlapping main lobes) of the multi-sector receiver. A DOA can be roughly (with a much higher level of direction error) determined as the direction of the sector antenna if the signal is received by only one sector. The signal DOA defines a semibounded line (in 2D) or a vertical plane (in 3D) that can be added to the MLAT equations in addition to the existing hyperbolic and/or spherical equations. The same principle can be applied for determining the AOA 34 of a signal received from transmitting RU 25 at a receiving RU 25 that is equipped with a multi-sector antenna. The signal DOA can aid in resolving RU positions and reduce RU position ambiguities. As shown in FIG. 3, the MLAT sensor constellation 24 may also include relay station(s) 33, which are discussed later.

One aspect of the present invention is the use of an ad-hoc wireless communications network 23 to provide the communications link among the RUs 25 and central processor 26. An ad-hoc communications network 23 is a self-organizing wireless network made up of mobile nodes that requires no fixed infrastructure. Using an ad-hoc wireless communications network 23 results in a distributed multi-hop network with a time-varying topology. This enables a plurality of RUs 25 to form an MLAT sensor constellation 24 that is dynamic not only in geometric configuration but also in the number of participating units.

In the ad-hoc wireless network 23 infrastructure of the present invention, mobile RUs 25 are simply communication nodes, which are responsible for routing messages to their intended destinations, and the central processor 26 can act as the network management center, or an independent network management center can be designated. The messages being routed include, for example, both the processed and/or unprocessed emitter signals received by the mobile RUs 25, measurements associated with the received emitter signals, RU control messages, system status information, and network management messages enabling network operations. In one embodiment of the present invention, the messages are routed in the form of data packets and existing packet switching techniques for wireless communications can be employed, for example.

The underlying communications network allows mobile RUs 25 to register to the network at any time as long as the mobile RUs 25 are within the network's coverage region, and also allows mobile RUs 25 to deregister anytime the mobile RUs 25 either decide or are commanded to do so or once a mobile RU 25 moves out of the network coverage region. For the underlying communications network, node-to-node communications are achieved through multi-hops; hence the network coverage region is an aggregation of the individual coverage areas of the network mobile RUs 25. Each mobile RU 25 may have a variable coverage radius depending on its transmitting power and receiving capability.

Each mobile RU 25 is required to have at least one transmitting and receiving module to facilitate network communication and to receive emitter signals if both are operating in similar frequency bands and with similar modulation schemes. An extreme case is when a mobile RU 25 is itself the target to be located and the emitter signal from the RU is a network communication signal, in which case only one receiving/transmitting module per mobile RU 25 is required. Otherwise a receiving module independent of the network communication module is required for conducting passive surveillance and an independent receiving/transmitting module is required for active surveillance. For communications utilizing multi hops, the hopping routes need to be determined in an efficient fashion.

Since an ad hoc network's operating configuration may change frequently, this communications architecture provides a challenge for developing an efficient routing protocol. Existing network routing techniques for ad-hoc wireless network and mesh network can be used for implementing the present invention. In one embodiment of the present invention, the system and method incorporate a communications route determination technique known as flooding for determining communications routes. In the flooding scheme, a mobile RU 25 may periodically transmit "flood" messages for detecting possible routes and this routing information is processed and distributed to all of the network nodes for the purpose of optimizing communication routes. Based on the destination and the flood information, a network node is capable of determining the best next node(s) for forwarding the message toward its destination. As a flood message travels through the nodes, the involved nodes' IDs will be sequentially added to the flood message body such that the route information is distributed. Optionally, information associated with quality of signal (e.g. received signal strength, bit error rate . . . ) and signal propagation time (e.g. difference between the receiving time and the transmitting time) are also added to the message body along with the node IDs to aid route optimization. In one embodiment, the node co-located with the central processor initiates the flood message. Upon each hop to the neighboring nodes, the nodes receiving the flood message will send back an acknowledgement to the currently transmitting node. Upon receiving at least one acknowledgement within a limited listening time window, the transmitting node identifies itself as an "inner node" and will not transmit any response message at this time. If no acknowledgement is received within the listening window the node identifies itself as an "edge node" and will send a "flood bounce message" back to the flood message initiating node. In this case, the message route is determined and sent along with the message body based on the route trace in the received flood message. As the flood bounce message travels back to the flood message-initiating node, each of the inner nodes along the route will update its routing database with the route information in the flood bounce message. After another longer listening time window without receiving the flood bounce message the rest of the inner nodes not on the flood bounce route will identify themselves as "quasi-edge nodes" with respect to this specific flood message and will send a "quasi-flood bounce message" back to the flood message initiating node. The "quasi-flood bounce message" is similar in content to the flood bounce message. The message flooding route should not reverse because the nodes will not respond to flood messages they previously handled and the nodes included in the routing trace will not send out acknowledgements or pass on the flood message.

Another type of flood message, which is often sent by non-central processor nodes is the "bounded flood message". The "bounded flood message" sets a parameter, such as a maximum number of hops allowed, to a limited number (e.g. seven or less) to control the extent of message flood and reduce unnecessary network traffic. The nodes on the bounded flood message path that either do not receive any acknowledgement messages or are where the bounded flood message terminates because the maximum number of hops allowed is reached, are identified as the "bounded edge nodes". After nodes are determined to be a bounded edge nodes, the identified bounded edge nodes send a "bounded flood bounce message" to the node initiating the bounded flood message. The bounded flood message traffic provides inner nodes with periodic updates for route information of proximate nodes, enabling the inner nodes to fix any broken routes by selecting alternative paths without retransmitting messages, such that the overall cost and latency of the communication system is reduced while the reliability is increased. In addition, any communications network bottlenecks are identified at the node level and the other nodes are allowed to divert part or all of its message traffic around or away from the identified bottleneck node to increase communications network efficiency. Any alterations to the message routing are adopted by the message recipients for subsequent use.

The flooding scheme allows route determination to be done in a distributed fashion at the node level such that the network traffic and possible bottlenecks can be reduced. The flooding scheme identifies multiple routes to the destination (increasing reliability and performance) and adapts the communications network configuration based on the mobility, registration/de-registration and communications patterns of the RUs 25 forming the MLAT sensor constellation 24. Any of the currently known or anticipated Mesh and MANET (Mobile Ad-hoc Network) protocols, including Ad Hoc On Demand Distance Vector (AODV) Routing (RFC 3561), Optimized Link State Routing (OLSR) Protocol (RFC 3626), Topology Dissemination Based on Reverse-Path Forwarding (TBRPF) (RFC 3684), Dynamic Source Routing (DSR), Temporally-Ordered Routing Algorithm (TORA) and the anticipated IEEE 802.11s and IEEE 802.16e, can support the Mesh ad hoc communications networks that are used as part of the mobile multilateration system of the present invention. In the case where a stable and static route is already established, the communications can follow the same established route with minimum decision making at the nodes involved. When an established stable route fails, the communications scheme reverts to a node decision-making format in which the affected node determines the optimum communication path available, based on the most recent flood data, and re-establishes communications via the optimum available path. The communications path can switch back to the original path when the communications path is re-established and determined to be optimum by the flooding scheme.

Independent of the communication scheme used to provide data transfer among the RUs and the central processor, two main aspects of the present invention relate to determining the positions of the mobile RUs and time synchronizing the RUs relative to one another. As explained below, other signal processing techniques can either be coupled with the baseline GPS localization/synchronization technique to achieve better performance or can be used stand alone (i.e., without GPS localization/synchronization) to provide a capability to detect and locate a target's relative position with respect to the position of the MLAT sensor constellation 24.

For example, embodiments of the present invention incorporate several non-GPS techniques to achieve mobile RU 25 positioning and synchronization as complementary or backup methods for situations in which GPS is either under-performing or unavailable. Specifically, when the GPS receiver of a particular mobile RU 25 is acquiring its first GPS position fix or is recovering from a power interruption or loss of satellite lock, depending upon the start condition and the actual receiver, an acquisition time of a few seconds to several minutes may be required before the first GPS position or time is obtainable. Other under-performing situations include when a GPS receiver is broken/offline, when the number of satellites in sight is too few, when the GPS signal is being jammed (e.g., where a high power signal overwhelms the GPS frequency bands, either intentionally or unintentionally), interfered with (e.g., by other communication systems such as UWB or sun activities), corrupted (e.g., because of multipath issues), or even spoofed (e.g., by false GPS signals generated by a malicious party), or simply when a particular RU is not equipped with a GPS receiver. In these situations, a mobile RU 25 cannot rely on its GPS receiver for correct position and time information (for synchronization purposes) and complementary measures must be taken. Also, many existing GPS receivers cannot simultaneously provide position and time information where a mobile RU's 25 motion exceeds threshold values. In these situations, the GPS alone is insufficient and complementary measures must be taken.

One such complementary measure according to the present invention is based on a "probing" operation, wherein a mobile RU 25 interrogates its neighboring mobile RU(s) 25 or relay station(s) 33 for responses. An example of the content of a short probe message 40 is shown in FIG. 4. In one embodiment of the present invention, the interrogatee responds to a short probe message 40 sent by the interrogator with a reply message 41 containing identification and the precise timestamp information of the receiving time of the short probe message 40 and the transmission time of the reply message 41. The time duration between the two timestamps is the processing delay at the interrogatee's end.

In an alternative embodiment, the reply message 41 only includes the processing delay information instead of the two timestamps. In addition, for systems with a fixed processing delay for probe reply messages 41, the receiving time can be eliminated from the reply messages. This often requires the probe reply message 41 to have the highest priority among other operations because the exact delay time needs to be calibrated precisely.

An example of the content of a long format probe message 50, a long format reply message 51 and a long format U-probe message 52 are shown in FIG. 5. A long-format probe message 50 solicits a reply message 51 containing not only identification and timestamp information but also the position information of the mobile RU 25 (e.g., where the RU is equipped with a GPS receiver). Another more detailed message format, the extended format probe message, includes not only identification, timestamp, and position information but also the velocity and acceleration information for the RU 25. The extended format probe messages are shown in FIG. 10. The extended format messages are preferred if velocity information is available (e.g. from GPS receiver, or from vehicle's speedometer and compass) and the acceleration and/or velocity information is then utilized in RU 25 position calculations.

Another complementary measure according to the present invention is based on a "U-probing" operation, in which the initiating mobile RU 25 sends a U-probe message 42 to solicit a neighboring mobile RU 25 or relay station 33 to respond with a short U-probe probe message 43. The initiating mobile RU 25 then responds to the short U-probe probe message 43 with a short U-probe reply message 44 containing identification and precise time stamp information. More specifically, a U-probe message sequence can be initiated by a first RU 25 (Node A) sending a U-probe message 42 or 52 to a second RU 25 (Node B); the second RU 25 (Node B) responds to the first RU 25 (Node A) with a U-probe probe message 43 or 53; and the first RU 25 replies with a U-probe reply message 44 or 54. Where the RU 25 is not equipped with a GPS receiver, the long format probe messages, 51, 53, and 54, contain position information relative to the position of the receiving node. Whenever the position information is unavailable, the long format messages, 51, 53, and 54, will contain a position confidence level with the lowest value, indicating the position field should be discarded. In the above and following context, a "node" is referred to as a network node that may be a mobile RU 25 or a relay station 33 that has probing capabilities. Each network node is assigned with a unique network address, which is used as the identification of the network node equipment, i.e., a mobile RU 25 or a relay station 33, in the MLAT sensor constellation 24.

In addition, for the short-format messages, 41, 43, and 44, or the long-format messages, 51, 53, and 54, at most two data fields are preferably designated for indicating the confidence levels of the time and position information of the message whenever they are applicable. These two indicators tell the quality of the timestamp and position information contained in the messages, which are subsequently used to aid the mobile RU 25 localization and synchronization functions. Another data field is preferably dedicated to indicate whether or not the intended probe/U-probe had designated addressee (s). This data field indicates the number of addressees. A field value of zero indicates that the message is for all recipients (i.e. an unaddressed message). An unaddressed probe/U-probe message solicits reply messages from each recipient. An addressed probe/U-probe message solicits responses from only those who are on the recipient address/ID list.

The following is a description of exemplary tasks for performing the self-synchronizing and self-surveying functions that facilitate operation of the mobile MLAT sensor system of the present invention. The exemplary tasks described provide the user with a mobile MLAT system capable of operating seamlessly using a dynamic ad-hoc wireless communications network with a minimum amount of human intervention.

The probing and U-probing techniques previously described are utilized for performing the exemplary tasks described below, for example. In the following descriptions, a neighboring node (i.e., a first mobile RU 25 or relay station 33) is a node within the coverage region of a local node (i.e., a second mobile RU 25 or relay station 33), but is not necessarily physically adjacent to the local node.

Task 01 involves an RU 25 detecting the presence of and acknowledging its presence to the neighboring mobile RU 25 or relay station 33 (nodes) through unaddressed probing/U-probing. Task 01 applies when a mobile RU 25 or relay station 33 is entering or joining into the network coverage region (MLAT sensor constellation 24). To obtain the information of neighboring mobile RUs 25 or relay stations 33, the new node can passively observe the communications or it can actively interrogate surrounding mobile RUs 25 or relay stations 33 by sending probe messages, 40 or 50, and U-probe messages, 42 or 52, to solicit responses. Any nodes receiving unaddressed probe messages, 40 and 50, or U-probe messages, 42 and 52, will respond to the unaddressed or addressed probe message and acknowledge the presence of the mobile RU 25 or relay station 33 initiating the message by adding its ID into their neighboring mobile RUs 25 or relay stations 33 (node) lists. Upon receiving reply messages, 41 or 51, the mobile RU 25 or relay station 33 initiating the message is able to establish or update its ID list of neighboring nodes. Such list contains information of nodes in sight and is used for optimizing network routes.

Task 02 involves achieving specific one-to-one, one-to-many, or many-to-one interrogations through addressed probing/U-probing. Task 02 applies when a mobile RU 25 or relay station 33 (node) wants to probe or U-probe a particular or a group of particular mobile RUs 25 or relay stations 33 (nodes) in the MLAT sensor constellation 24 (network). Task 02 is achieved by including the initiating mobile RU 25 or relay station 33 identifying data in the probe/U-probe messages. Receiving mobile RUs 25 or relay stations 33 (nodes) will respond if the initiating RU 25 or relay station 33 is on the probe or U-probe message recipient's address/ID list.

Figure 6:
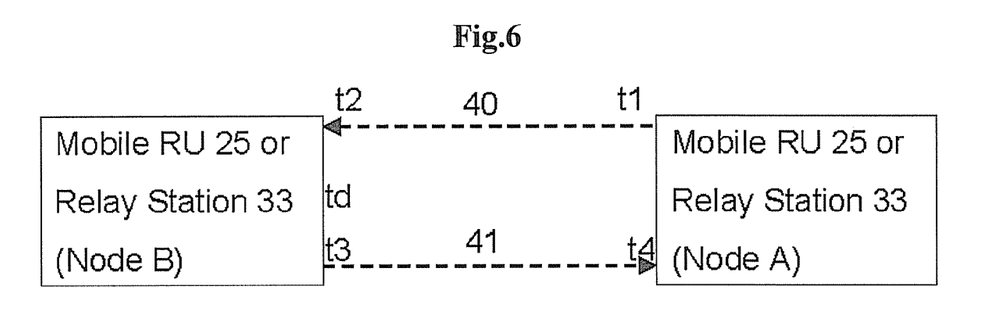
FIG. 6 is a block diagram of time synchronization message flow in one embodiment of the present invention.

Task 03 involves synchronizing a mobile RU's 25 or relay station's 33 local clock to a foreign clock (i.e., the clock of another mobile RU 25 or relay station 33) by probing the other mobile RU 25 or relay station 33 (foreign node). Task 03 applies when a mobile RU 25 or relay station 33, referred to as Node A, wants to synchronize its clock to the clock of another mobile RU 25 or relay station 33, referred to as Node B's clock. Referring to FIG. 6, an example of a time synchronization message sequence is shown. The time synchronization message sequence is initiated when probe message 40 is sent from Node A to Node B and, in response, Node B sends a probe reply message 41 to Node A. Upon sending the Probe message 40, Node A records the transmitting time t1 according to its local clock. Upon receiving the probe message 40 at Node B, Node B records the receiving time t2 according to its local clock. Node B processes the message and replies to Node A. The probe reply message 41 contains the previously recorded t2 and the transmitting time of the reply message t3 from Node B. Upon receiving the Probe reply message 42 at Node A, Node A records the receiving time t4 according to its local clock. The propagation time, tp, is then calculated as tp=(t4−t1−t3+t2)/2. Node A's clock time is then calibrated by aligning the probe transmitting time and the reply receiving time to Node B's clock time by assigning t1'=t2−tp and t4'=t3+tp, for example. If Node B's processing delay td, where td=t3−t2, is fixed and is well calibrated, only t2 or t3 needs to be included in the reply message since tp=(t4−t1−td)/2 can be obtained without knowing both t2 and t3.

To synchronize the clock values, Node A performs any of the following computations (either using an on-board CPU or by communicating with a remote CPU):

(1) t4' is set to t3+tp (2) t4' is set to t2+td+tp (3) t1' is set to t2−tp and t4 is set to (t1'+(t4−t1)

(4) t1' is set to t3−td−tp; or (5) perform weighted averaging on any combination of computations (1)-(4)

Where td=t3−t2;

tp=[(t4−t1)−(t3−t1)]/2 or tp=[(t4−t1)−td]/2, and t4' is t4 after synchronization and t1' is t1 after synchronization. To perform the clock synchronization by method (1)-(4) above, the probe reply message 41 must at least contain the following:

For 1: {t3, td} or {t2, t3}
For 2: {t2, td} or {t2, t3}
For 3: {t2, td} or {t2, t3}
For 4: {t3, td} or {t2, t3}
For 5: {t3, td}, {t2, td}, or {t2, t3}

For systems designed to have a fixed td, t3 can be eliminated from the probe reply message 41 since td is implicitly known to both of the mobile RUs 25 or relay stations 33 (Node A & Node B). Knowing td and t2 implies knowing t3 since t3=t2+td; similarly knowing td and t3 implies knowing t2 since t2=t3−td. In such fixed td systems, the reply message only must contain either t3 or t2.

Note that if clock time quality indicators are available, Node A may perform synchronization only if the expected quality of the synchronized clock time is better than the original quality. For example, if the quality indicator is in a format of timing error standard deviation. For each pass of time synchronization through probing, an additive timing noise will be added to the transmitted clock time. The acquired clock time from Node B at Node A can be modeled to have an error standard deviation of std_CLKA'=sqrt(std_CLKB$^2$+std_pass$^2$). Compare to Node A's present expected clock time error standard deviation std_CLKA, Node A may update its clock time with the acquired clock time if std_CLKA'<std_CLKA, otherwise Node A will ignore the acquired clock time from Node B. A more sophisticated approach is to fuse the present clock time with the acquired clock time. For any two clock time values, for example CLK1 and CLK2, if the error standard deviations, say std_CLK1 and std_CLK2, and the correlation between them is known, a fused clock time value, CLK12, can be obtained through a linear fusion approach. A simplified linear fusion gives the fused clock time CLK12=w1*CLK1+w2*CLK2 where for i,j=1 and 2, wi=(A1i+A2i)$^{-1}$*[(A11+A21)$^{-1}$+(A12+A22)$^{-1}$]$^{-1}$ and Aij=std_CLKi if i=j or CLKi and CLKj are totally correlated, Aij=sqrt(std_CLKi*std_CLKj) if i does not equal to j and CLKi and CLKj are partially correlated, and Aij=0 if i does not equal to j and CLKi and CLKj are uncorrelated.

Figure 7:
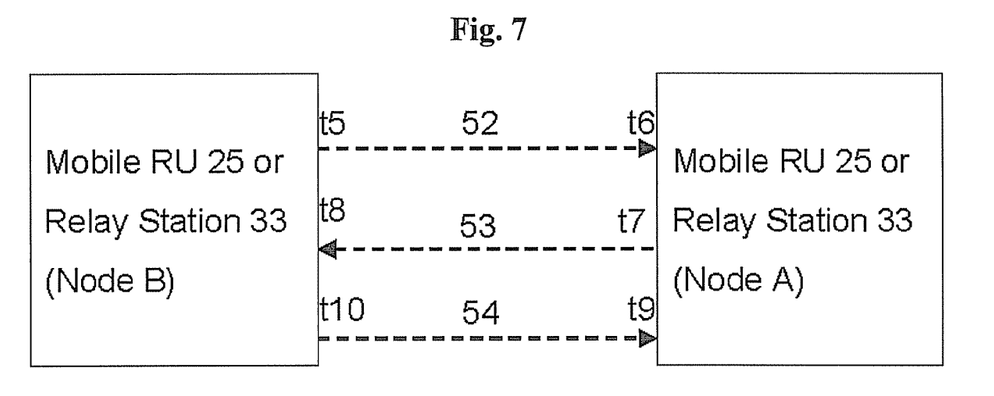
FIG. 7 is a block diagram of ranging message flow in one embodiment of the present invention.

The propagation time tp also enables determination of the distance or range, R, between the mobile RUs 25 or relay stations 33 involved (Node A and Node B). For the mobile RU 25 or relay stations 33 (Node A), to calculate the distance between Node B and Node A, tp is multiplied with the propagation speed, which is the speed of light, such that the distance (or range) to Node B is obtained as R=tp*Light Speed For Node B to obtain the range to Node A, Node B needs to initiate another probing to Node A. Instead of using two probe actions to achieve the bi-directional range interrogation, more efficiently a "U-probing" can be initiated by either Node B or Node A. For example, as shown in FIG. 7, where an initiating Node B transmits the U-probe message 52 to Node A at 't5', Node A receives the U-Probe message 52 at 't6' and starts the probe message sequence as previously discussed. This way, Node B can calculate tp from {t5, t6, t7, t8} so the range between nodes is also known.

If a mobile RU 25 or relay station 33 (node) is only interested in measuring the distance between other nodes, only td needs to be included in the reply and if td is fixed and well calibrated then none of t2, t3 or td needs to be transmitted with the reply.

Figure 9:
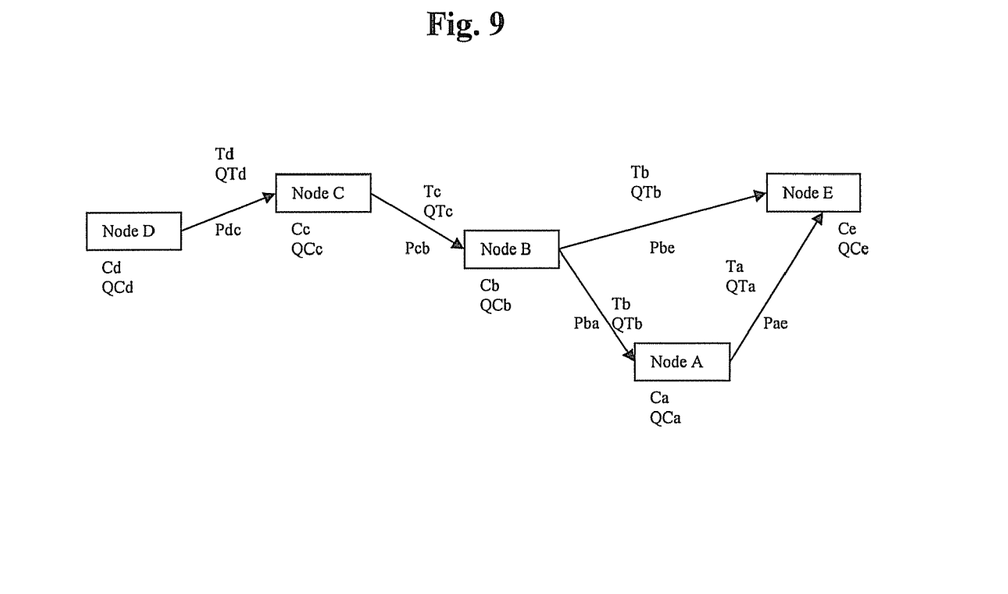
FIG. 9 is a block diagram of time synchronization chaining between nodes in one embodiment of the present invention.

Note that a local clock can also be synchronized to a foreign clock using a chain of probe/U-probe messages. That is, a mobile RU 25 or relay station 33 (Node A) can be indirectly synchronized to another mobile RU 25 or relay station 33 (Node D) through multiple probing from Node C to Node D, Node B to Node C and then Node A to Node B. In this case, the clock time of Node D is distributed throughout the aforementioned chain of nodes. Note that there may be multiple chains and the chains may diverge and converge such that they form a network where a master clock time can be distributed across the network. Since the accuracy of distributed time may decrease as the layers of distribution increase, a time quality indicator will reflect this degradation of the time quality and time distribution will halt wherever the quality indicator indicates the clock time quality is not worthy of further distribution. Note that such master time to be distributed may be any clock of choice that is similar or superior to the other nodes' clock. Such master time may be a GPS receiver time or an atomic clock time that provide better timing or simply an equal-quality clock time that is just selected as the time reference. Also note that such time distribution mechanism can be achieved without probing actions. Where the propagation delay is known, any message containing timestamp information and timestamp quality information can be used for time distribution. If the relative positions of the transmitter and the receiver are known at the time of delivering the message, the propagation time (i.e. tp) can be calculated from the distance the signal traveled. An example of the time distribution mechanism is given in FIG. 9. In FIG. 9, each node A, B, C, D, E maintains a self running clock denoted as Ca, Cb, Cc, Cd, and Ce and corresponding clock quality indicator QCa, QCb, QCc, QCd, and QCe respectively. An arrow represents a time distribution action which may be implemented with probing, U-probing (as explained in Task 04), or any other techniques. The distributed time, from left to right, sequentially in time, are denoted as Td, Tc, Tb, and Ta with their corresponding timestamp quality indicator QTd, QTc, QTb, and QTa and the propagation delays of Pdc, Pcb, Pba, Pbe, and Pae. In the first step, the time Td based on Cd of Node D is distributed to Node C. Upon receiving Td and QTd at Node C, Node C may optimize its clock value based on Td, QTd, Cc, QCc, and Pdc and update Cc and QCc with the optimized results accordingly. A similar process occurs in the next few steps where the time of Node C is distributed to Node B, then from Node B to Node A and Node E (i.e. diverge), and at last from Node A to Node E (i.e. converge).

Task 04 involves synchronizing the clock of another mobile RU 25 or relay station 33 (foreign clock) to a local mobile RU's 25 or relay station's 33 clock by U-probing. Task 04 applies when a mobile RU 25 or relay station 33, referred to as Node A, wants the clock of another mobile RU 25 or relay station 33, referred to as Node B's clock, to be synchronized to Node A's clock. As shown in FIG. 7, Node A sends out a U-probe message 42 to Node B and upon receiving Node A's U-probe message 42, Node B sends out a U-probe probe message 43 to Node A and the rest of the procedure is similar to the probe operation. The U-probe probe message 43 sent from Node B contains information including the receipt time of U-probe message 42 and the transmitting time of the U-probe probe message 43 such that Node A can determine the range and time by processing the U-probe probe message 43. A single U-probe operation achieves bi-directional time distribution and ranging that otherwise needs to be done by two probe operations. A U-probe is especially useful when Node A has a superior clock and wants the surrounding nodes to be synchronized to its superior clock. Like probing, as the clock time is distributed throughout layers of probing, the quality decreases and the distribution halts when the quality indicator shows that the clock time is no longer worthy of further distribution.

Task 05 involves locating a local mobile RU 25 or relay station 33 (node) by simultaneously probing multiple mobile RUs 25 or relay stations 33 (foreign nodes). Task 05 applies when a mobile RU 25 or relay station 33 (node) wants its position to be validated or determined. For location validation and determination, the Probe and U-Probe messages use the long format message, 50 and 52, which contains the transmitting mobile RU's or relay station's position information. For example, to validate its position, Node A sends a long-format probe message 50 to Node B and upon receiving the probe reply message 51 from Node B, Node A is able to validate its location by comparing its self-generated position to the Node B position and range information obtained. For the case where Node A wants to determine its location, Node A sends out a long-format probe message 50 with multiple addresses such that, upon receiving multiple replies, Node A obtains the ranges and positions of the addressees and can determine its own position by multilateration. For example, assume that vector R denotes the obtained ranges corresponding to the addressee's position array Q; vector p denote the position of the node to be solved; a function D(p, Q) formulates the distance vector from p to positions of Q; and an error vector e is formulated as e=R−D. The multilateration calculation for determining the position, p, of the node can be achieved by performing:

$$p = \underset{p}{\arg\min}\{e^T \text{cov}^{-1}(e)e\}$$

Where:

$e^T$ is the transpose of e;

$\text{cov}^{-1}(e)$ is the inverse of the covariance of e;

arg min stands for the argument of the minimum;

$$\underset{p}{\arg\min}$$

means the value of the given argument p for which the value of the given expression attains its minimum value; and the term $e^T \text{cov}^{-1}(e)e$ is known as the weighted least square cost of e.

Methods to solve above cost minimization problem include the Newton-Rapson method and the Simplex Downhill Method (see Numerical Recipes in C, The Art of Scientific Computing, Second Edition William H. Press, et al. CAMBRIDGE UNIVERSITY PRESS). An example of above formulation in three dimensional cases can be written as:

$$p = \begin{bmatrix} x_0 \\ y_0 \\ z_0 \end{bmatrix} \quad Q = \begin{bmatrix} X_1 & X_2 & X_3 & X_4 \\ Y_1 & Y_2 & Y_3 & Y_4 \\ Z_1 & Z_2 & Z_3 & Z_4 \end{bmatrix} \quad R = \begin{bmatrix} \tilde{R}_{01} \\ \tilde{R}_{02} \\ \tilde{R}_{03} \\ \tilde{R}_{04} \end{bmatrix}$$

$$D = \begin{bmatrix} \sqrt{(x_0 - X_1)^2 + (y_0 - Y_1)^2 + (z_0 - Z_1)^2} \\ \sqrt{(x_0 - X_2)^2 + (y_0 - Y_2)^2 + (z_0 - Z_2)^2} \\ \sqrt{(x_0 - X_3)^2 + (y_0 - Y_3)^2 + (z_0 - Z_3)^2} \\ \sqrt{(x_0 - X_4)^2 + (y_0 - Y_4)^2 + (z_0 - Z_4)^2} \end{bmatrix}$$

$$e = \begin{bmatrix} \tilde{R}_{01} - \sqrt{(x_0 - X_1)^2 + (y_0 - Y_1)^2 + (z_0 - Z_1)^2} \\ \tilde{R}_{02} - \sqrt{(x_0 - X_2)^2 + (y_0 - Y_2)^2 + (z_0 - Z_2)^2} \\ \tilde{R}_{03} - \sqrt{(x_0 - X_3)^2 + (y_0 - Y_3)^2 + (z_0 - Z_3)^2} \\ \tilde{R}_{04} - \sqrt{(x_0 - X_4)^2 + (y_0 - Y_4)^2 + (z_0 - Z_4)^2} \end{bmatrix}$$

Where $\tilde{R}_{ij}$ denotes the distance or range measurement from the i-th RU 25 to the j-th RU 25.

The determination of position operation described above assumes Node A has computation capabilities sufficient to perform the necessary multilateration computations. Where Node A does not have sufficient computational power, the multiple addressee's range and position information should be routed to a central processor for multilateration processing with the result being distributed back to Node A. Alternatively, Node A can send out an unaddressed long-format probe message 52 to initiate a position determining multilateration session. Again, the probe reply message 51 also contains the quality indicator of the position information, such that position information with a low quality indicated should not be taken into account by the system. It should be noted that by simultaneously probing multiple nodes using the long format message, an initiating mobile RU 25 or relay station 33 (node) can simultaneously resolve both its position and time. For nodes capable of performing multilateration on itself or surrounding nodes, it is logical to allow it to be able to perform multilateration on targets. This allows nodes to calculate target positions locally, reducing the central processor's computational workload. Another method is to designate portion of these nodes to act as regional central processors to perform multilateration on targets and then distribute the results back to the central processor if needed.

Task 06 involves locating a local stationary mobile RU 25 or relay station 33 (node) by probing a moving mobile RU 25 or relay station 33 (foreign moving node) multiple times or by probing a combination of multiple moving and/or stationary mobile RU 25 or relay station 33 nodes multiple times. Task 06 applies when a mobile RU 25 or relay station 33 (node) is not moving and its position needs to be determined. When there is at least one neighboring mobile RU 25 or relay station 33 (node), the position of the stationary RU 25 or relay station 33 (node) can be determined by probing the neighboring moving mobile RU 25 or relay station 33 consecutively with long format probe messages 50. By consecutively probing the at least one moving mobile RU 25 or relay station 33 (node), the stationary mobile RU 25 or relay station 33 (node) obtains multiple positions and ranges to the at least one moving mobile RU 25 or relay station 33 (node), which are equivalent to ranging from multiple moving mobile RUs 25 or relay stations 33. Based on the received data, the position of the stationary RU 25 or relay station 33 can then be calculated. This only applies when the RU 25 or relay station 33 to be located is stationary. When a moving RU 25 or relay station 33 (node) wants the stationary RU 25 or relay station 33 (node) to determine its own location, the moving RU 25 or relay station 33 sends out consecutive long format U-probe messages 52 to the stationary RU 25 or relay station 33 to initiate the messaging necessary to perform the position calculations. The calculations of multilateration on the node can be done similar to that of Task 05 except now in addition to the foreign stationary nodes, any foreign moving node(s) at different locations in time can be utilized.

Task 07 involves locating another stationary RU 25 or relay station 33 (foreign stationary node) by probing the other stationary RU 25 or relay station 33 (foreign stationary node) from a moving RU 25 or relay station 33 (local moving node) multiple times or from a combination of multiple moving and stationary RUs 25 or relay stations 33 multiple times. Task 07 is similar to Task 06 except now the moving RU 25 or relay station 33 is sending out the long format probe messages 50. This task applies when a moving RU 25 or relay station 33 (node) wants to determine a stationary RU's 25 or relay station's 33 position. The moving RU 25 or relay station 33 sends out consecutive probe messages 50 such that the ranges to the stationary RU 25 or relay station 33 are obtained. The position of the stationary RU 25 or relay station 33 is then obtained from the positions of the moving RUs 25 or relay stations 33 and the ranges to the stationary RU 25 or relay station 33. This task also applies when a stationary RU 25 or relay station 33 wants the moving RU 25 or relay station 33 to determine the stationary RU's 25 or relay station's 33 location. In this case, the stationary RU 25 or relay station 33 sends out consecutive long format U-probe messages 50 to the moving RUs 25 or relay stations 33 to initiate the messaging necessary to perform the position calculations. The calculations of multilateration on the foreign stationary node can be done similar to that of Task 06 except now it is the foreign stationary node to be calculated with the ranges measured collectively by any local stationary and/or moving nodes.

Task 08 involves estimating the relative speed of a RU 25 or relay station 33 by probing the RU 25 or relay station 33 periodically from another RU 25 or relay station 33. Task 08 applies when the relative speed of a RU 25 or relay station 33 needs to be determined. The relative speed of another RU 25 or relay station 33 (foreign node) to a RU 25 or relay station 33 (local node) can be determined by periodically probing the same RU 25 or relay station 33 (foreign node) from a RU 25 or relay station 33 (local node). A function of range with respect to time can be established through the periodic probe messaging and the relative speed of the other RU 25 or relay station 33 (foreign node) is determined by calculating the derivative of the range function. The direction of the obtained speed is always pointing from the RU 25 or relay station 33 (foreign node) to the RU 25 or relay station 33 (local node). For example, the speed, $s_t$, of an RU 25 toward an observation RU 25 at time t of an observation period can be obtained from:

$$s_t = s_0 + a \cdot t$$

Where $s_0$ is the estimated initial speed at the beginning of the observation period, a is the estimated acceleration of the observation period, and both are obtained by solving $s_0$ and a as follows:

$$\begin{bmatrix} \frac{R_1 - R_0}{t_1 - t_0} \\ \vdots \\ \frac{R_K - R_0}{t_K - t_0} \end{bmatrix} = \begin{bmatrix} \frac{t_1 - t_0}{2} & 1 \\ \vdots & \vdots \\ \frac{t_K - t_0}{2} & 1 \end{bmatrix} \cdot \begin{bmatrix} a \\ s_0 \end{bmatrix}$$

Where $R_0 \ldots R_K$ are the ranges measured at time $t_0 \ldots t_K$ of the observation period. A common approach to solve the above equation is by using a pseudo inversion technique such that the least-squares solution of $s_0$ and a are obtained. Another technique to obtain the speed toward the observation RU 25 is by measuring the Doppler shift of the carrier frequency of the receiving Probe reply signals. For example the Doppler shift, $\Delta f$, in Hz, is defined as the frequency difference between the transmitting carrier frequency, $f_0$, and the receiving carrier frequency, f. The speed of the RU 25 with respect to the observation RU 25 can be obtained from:

$$s_i = \Delta f \frac{C}{f_0}$$

Where C is the speed of light in air and $\Delta f = f_0 - f$

Task 09 involves estimating the velocity (direction and speed) of a RU 25 or relay station 33 (local node) by probing from at least three other stationary RUs 25 or relay stations 33 (foreign stationary nodes). Task 09 applies when the velocity of a RU 25 or relay station 33 needs to be determined. Based on Task 08 the speed of a RU 25 or relay station 33 (foreign node) moving toward the RU 25 or relay station 33 (local node) can be determined by periodically sending long format probe messages 50 to the other RUs 25 or relay stations 33 (foreign nodes). If three or more RUs 25 or relay stations 33 (local nodes) send long format probe messages 50 to an RU 25 or relay station 33 (foreign node), the speed of the RU 25 or relay station 33 (foreign node) toward the three or more RUs 25 or relay stations 33 (local nodes) can be obtained. The velocity of the RU 25 or relay station 33 (foreign node) is obtained by solving the equations of directional speeds. If the directional speeds span a 3D coordinate system, all three velocity components can be obtained. For example, the velocity of a target RU 25 at location $[X_0, Y_0]$ can be measured by observation RUs 25 at locations $[X_1, Y_1], \ldots, [X_K, Y_K]$ given the measured speeds, $s_1, \ldots s_K$, with respect to the observation RUs 25. Note that since the locations of RUs 25 are known, the azimuth angle pointing from the target RU 25 to the observation RUs 25, $\theta_1, \ldots, \theta_K$ in degrees clockwise from north, are known. The direction component $\theta_0$, and the speed component, $s_0$, of the velocity of the target RU 25 can be calculated by solving $s_0$ and $\theta_0$ in following equations:

$$\begin{cases} s_1 = s_0 \cdot \cos(\theta_1 - \theta_0) \\ \vdots \\ s_{1K} = s_0 \cdot \cos(\theta_{1K} - \theta_0) \end{cases}$$

Another technique establishes the position of the emitter as a function of time such that the velocity is obtained as the first derivative of the position function. The results from both techniques can be used to validate the other or to validate velocity information, such as can be provided by a GPS receiver or a speedometer and compass.

Task 10 involves forming relative positions between a group of RUs 25 and/or relay stations 33 by sending short format probe messages 40 or long format probe messages 50 to determine the ranges between the group of RUs 25 and/or relay stations 33 in a single round. Task 10 applies when the RUs 25 and/or relay stations 33 involved are mostly without knowledge or recent updates of their positions. In this case the relative positions of the RUs 25 or relay stations 33 can be determined if the ranges between RUs 25 and/or relay stations 33 are available. A multidimensional optimization problem is to be solved to determine node positions based on sufficient node-to-node range measurements. The estimates of the RUs 25 and/or relay stations 33 positions minimize the overall cost formed by the range measurements. The relative locations of the RUs 25 and/or relay stations 33 can be determined by purely using range measurements without any prior knowledge of RUs 25 and/or relay stations 33 earth coordinate positions. For 3D absolute positions, at least three RUs 25 and/or relay stations 33 with absolute position information are required. For 2D positions, where the elevations of the RUs 25 and/or relay stations 33 are known, at least two RUs 25 and/or relay stations 33 with absolute position information are required. An example of the multilateration calculation on multiple nodes is as following. Based on notations of Task 05, the solution of p can be solved by performing:

$$p = \underset{p}{\operatorname{argmin}}\{e^T \operatorname{cov}^{-1}(e) e\}$$

Where:

Vector p denotes the positions of the local nodes to be solved;

Vector R denotes the ranges collectively obtained from local nodes to their foreign nodes, which are written correspondingly in a position array Q where Q contains p as part of its unknown members and the rest are known positions;

function D(p, Q) formulates the distance vector from p to the positions of Q; and an error vector e is formulated as e=R−D.

Note that there can only be a relative solution for p if Q contains an insufficient number of members with known positions. An example of the above formulation in two dimensional cases can be written as the following. Assume a reference RU 25 has a position $[X_0, Y_0] = [0, 0]$ and another RU's 25 relative position to the reference RU 25 is known as $[X_1, Y_1]$. The positions of two other RUs 25 can be solved by formulating $$R = \begin{bmatrix} \tilde{R}_{02} \\ \tilde{R}_{03} \\ \tilde{R}_{12} \\ \tilde{R}_{13} \\ \tilde{R}_{23} \end{bmatrix}$$

$$Q = \begin{bmatrix} X_0 & X_1 & x_2 & x_3 \\ Y_0 & Y_1 & y_2 & y_3 \end{bmatrix}$$

$$p = \begin{bmatrix} x_2 \\ y_3 \\ x_3 \\ y_3 \end{bmatrix}$$

$$D = \begin{bmatrix} \sqrt{(X_0 - x_2)^2 + (Y_0 - y_2)^2} \\ \sqrt{(X_0 - x_3)^2 + (Y_0 - y_3)^2} \\ \sqrt{(X_1 - x_2)^2 + (Y_1 - y_2)^2} \\ \sqrt{(X_1 - x_3)^2 + (Y_1 - y_3)^2} \\ \sqrt{(x_2 - x_3)^2 + (y_2 - y_3)^2} \end{bmatrix}$$

$$e = \begin{bmatrix} \tilde{R}_{01} - \sqrt{(X_0 - x_2)^2 + (Y_0 - y_2)^2} \\ \tilde{R}_{02} - \sqrt{(X_0 - x_3)^2 + (Y_0 - y_3)^2} \\ \tilde{R}_{12} - \sqrt{(X_1 - x_2)^2 + (Y_1 - y_2)^2} \\ \tilde{R}_{13} - \sqrt{(X_1 - x_3)^2 + (Y_1 - y_3)^2} \\ \tilde{R}_{23} - \sqrt{(x_2 - x_3)^2 + (y_2 - y_3)^2} \end{bmatrix}$$

Another example where only the position, $[X_0, Y_0]=[0, 0]$, of reference RU 25 is known, the positions of the rest of the RUs 25 are determined relative to the reference RU 25 in a form of the measured ranges and the azimuths to be solved.

$$R = \begin{bmatrix} \tilde{R}_{02} \\ \tilde{R}_{03} \\ \tilde{R}_{12} \\ \tilde{R}_{13} \\ \tilde{R}_{23} \end{bmatrix}$$

$$Q = \begin{bmatrix} X_0 & X_0 + \tilde{R}_{01}\sin(\theta_1) & X_0 + \tilde{R}_{02}\sin(\theta_2) & X_0 + \tilde{R}_{03}\sin(\theta_3) \\ Y_0 & Y_0 + \tilde{R}_{01}\cos(\theta_1) & Y_0 + \tilde{R}_{02}\cos(\theta_2) & Y_0 + \tilde{R}_{03}\cos(\theta_3) \end{bmatrix}$$

$$p = \begin{bmatrix} \theta_1 \\ \theta_2 \\ \theta_3 \end{bmatrix}$$

$$D = \begin{bmatrix} \sqrt{(\tilde{R}_{01}\sin(\theta_1))^2 + (\tilde{R}_{01}\cos(\theta_1))^2} \\ \sqrt{(\tilde{R}_{02}\sin(\theta_2))^2 + (\tilde{R}_{02}\cos(\theta_2))^2} \\ \sqrt{(\tilde{R}_{03}\sin(\theta_3))^2 + (\tilde{R}_{03}\cos(\theta_3))^2} \\ \sqrt{(\tilde{R}_{01}\sin(\theta_1) - \tilde{R}_{02}\sin(\theta_2))^2 + (\tilde{R}_{01}\cos(\theta_1) - \tilde{R}_{02}\cos(\theta_2))^2} \\ \sqrt{(\tilde{R}_{01}\sin(\theta_1) - \tilde{R}_{03}\sin(\theta_3))^2 + (\tilde{R}_{01}\cos(\theta_1) - \tilde{R}_{03}\cos(\theta_3))^2} \\ \sqrt{(\tilde{R}_{02}\sin(\theta_2) - \tilde{R}_{03}\sin(\theta_3))^2 + (\tilde{R}_{02}\cos(\theta_2) - \tilde{R}_{03}\cos(\theta_3))^2} \end{bmatrix}$$

-continued $$e = \begin{bmatrix} \tilde{R}_{01} - \sqrt{(\tilde{R}_{01}\sin(\theta_1))^2 + (\tilde{R}_{01}\cos(\theta_1))^2} \\ \tilde{R}_{02} - \sqrt{(\tilde{R}_{02}\sin(\theta_2))^2 + (\tilde{R}_{02}\cos(\theta_2))^2} \\ \tilde{R}_{03} - \sqrt{(\tilde{R}_{03}\sin(\theta_3))^2 + (\tilde{R}_{03}\cos(\theta_3))^2} \\ \tilde{R}_{12} - \sqrt{(\tilde{R}_{01}\sin(\theta_1) - \tilde{R}_{02}\sin(\theta_2))^2 + (\tilde{R}_{01}\cos(\theta_1) - \tilde{R}_{02}\cos(\theta_2))^2} \\ \tilde{R}_{13} - \sqrt{(\tilde{R}_{01}\sin(\theta_1) - \tilde{R}_{03}\sin(\theta_3))^2 + (\tilde{R}_{01}\cos(\theta_1) - \tilde{R}_{03}\cos(\theta_3))^2} \\ \tilde{R}_{23} - \sqrt{(\tilde{R}_{02}\sin(\theta_2) - \tilde{R}_{03}\sin(\theta_3))^2 + (\tilde{R}_{02}\cos(\theta_2) - \tilde{R}_{03}\cos(\theta_3))^2} \end{bmatrix}$$

Where $\theta_i$ denotes the azimuth in degree or the clockwise angle from north of the direction pointing from the reference RU 25 to the i-th RU 25.

Task 11 involves forming relative positions between a group of RUs 25 and/or relay stations 33 (nodes) by sending probe messages to determine the ranges and velocities between the RUs 25 and/or relay stations 33 through multiple rounds of probing. Task 11 also applies when the RUs 25 and/or relay stations 33 involved are mostly without recent updates of positions. Task 11 uses a more sophisticated approach to handle the problem of Task 10 such that the motions of RUs 25 and/or relay stations 33 are considered. Note that the movement of the RUs 25 or relay stations 33 needs to be taken into account where most of the obtained ranges are not synchronized in time. This requires motion information, such as velocity and acceleration for the RUs 25 and/or relay stations 33. Where sufficient range measurements are available, the positions and velocities (and accelerations) can be estimated together. If the motions of the RUs 25 and/or relay stations 33 are known, the movements of RUs 25 and/or relay stations 33 can be modeled such that synchronized position estimates can be produced with fewer measurements. An example of the multilateration calculation on multiple nodes with the knowledge of node velocities is as follows: Assume that vector T represents the elapsed time from the probing take place to the desired time positions of the nodes need to be generated at the nodes and arrays V and A are the velocities and accelerations of the nodes at the time the probing take place. Based on the notations of Task 10, the solution of p can then be solved by performing $$p = \underset{p}{\mathrm{argmin}}\{e^T \mathrm{cov}^{-1}(e)e\}.$$

Where:
Vector p denotes the positions of the local nodes to be solved at the desired time but not the probing time;
Vector R denotes the probed ranges to node locations corresponding to position array Q where Q contains p as part of its unknown members and the rest are nodes with known positions;
function vector P(p, V, A, T) denotes the positions of the nodes to be solved at the time the probing take place;
function D(P, Q) formulates the distance vector from P to the positions of Q; and an error vector e is formulated as e=R−D.

As was the case with p, there can only be a relative solution for P if Q contains an insufficient number of members with known positions. An example of the above formulation in two dimensional cases can be written as the following. Assume a reference RU 25 has a position $[X_0, Y_0]=[0, 0]$ and an other RU's 25 relative position to the reference RU 25 is known as $[X_1, Y_1]$. The positions of two other RUs 25 can be solved by formulating $$R = \begin{bmatrix} \tilde{R}_{02} \\ \tilde{R}_{03} \\ \tilde{R}_{12} \\ \tilde{R}_{13} \\ \tilde{R}_{23} \end{bmatrix} \quad Q = \begin{bmatrix} X_0 & X_1 & x_2 & x_3 \\ Y_0 & Y_1 & y_2 & y_3 \end{bmatrix} \quad T = \begin{bmatrix} t_0 \\ t_1 \\ t_2 \\ t_3 \end{bmatrix} \quad p = \begin{bmatrix} x_2 \\ y_2 \\ x_3 \\ y_3 \end{bmatrix}$$

$$V = \begin{bmatrix} v_{x0} \\ v_{y0} \\ v_{x1} \\ v_{y1} \\ v_{x2} \\ v_{y2} \\ v_{x3} \\ v_{y3} \end{bmatrix} \quad A = \begin{bmatrix} a_{x0} \\ a_{y0} \\ a_{x1} \\ a_{y1} \\ a_{x2} \\ a_{y2} \\ a_{x3} \\ a_{y3} \end{bmatrix} \quad P = \begin{bmatrix} X_0 - v_{x0} \cdot t_0 - \frac{1}{2}a_{x0} \cdot t_0^2 \\ Y_0 - v_{y0} \cdot t_0 - \frac{1}{2}a_{y0} \cdot t_0^2 \\ X_1 - v_{x1} \cdot t_1 - \frac{1}{2}a_{x1} \cdot t_1^2 \\ Y_1 - v_{y1} \cdot t_1 - \frac{1}{2}a_{y1} \cdot t_1^2 \\ x_2 - v_{x2} \cdot t_2 - \frac{1}{2}a_{x2} \cdot t_2^2 \\ y_2 - v_{y2} \cdot t_2 - \frac{1}{2}a_{y2} \cdot t_2^2 \\ x_3 - v_{x3} \cdot t_3 - \frac{1}{2}a_{x3} \cdot t_3^2 \\ y_3 - v_{y3} \cdot t_3 - \frac{1}{2}a_{y3} \cdot t_3^2 \end{bmatrix}$$

$$D = \begin{bmatrix} \sqrt{\left(X_0 - v_{x0} \cdot t_0 - \frac{1}{2}a_{x0} \cdot t_0^2 - \left(x_2 - v_{x2} \cdot t_2 - \frac{1}{2}a_{x2} \cdot t_2^2\right)\right)^2 + \left(Y_0 - v_{y0} \cdot t_0 - \frac{1}{2}a_{y0} \cdot t_0^2 - \left(y_2 - v_{y2} \cdot t_2 - \frac{1}{2}a_{y2} \cdot t_2^2\right)\right)^2} \\ \sqrt{\left(X_0 - v_{x0} \cdot t_0 - \frac{1}{2}a_{x0} \cdot t_0^2 - \left(x_3 - v_{x3} \cdot t_3 - \frac{1}{2}a_{x2} \cdot t_3^2\right)\right)^2 + \left(Y_0 - v_{y0} \cdot t_0 - \frac{1}{2}a_{y0} \cdot t_0^2 - \left(y_3 - v_{y3} \cdot t_3 - \frac{1}{2}a_{y3} \cdot t_3^2\right)\right)^2} \\ \sqrt{\left(X_1 - v_{x1} \cdot t_1 - \frac{1}{2}a_{x1} \cdot t_1^2 - \left(x_2 - v_{x2} \cdot t_2 - \frac{1}{2}a_{x2} \cdot t_2^2\right)\right)^2 + \left(Y_1 - v_{y1} \cdot t_1 - \frac{1}{2}a_{y1} \cdot t_1^2 - \left(y_2 - v_{y2} \cdot t_2 - \frac{1}{2}a_{y2} \cdot t_2^2\right)\right)^2} \\ \sqrt{\left(X_1 - v_{x1} \cdot t_1 - \frac{1}{2}a_{x1} \cdot t_1^2 - \left(x_3 - v_{x3} \cdot t_3 - \frac{1}{2}a_{x3} \cdot t_3^2\right)\right)^2 + \left(Y_1 - v_{y1} \cdot t_1 - \frac{1}{2}a_{y1} \cdot t_1^2 - \left(y_3 - v_{y3} \cdot t_3 - \frac{1}{2}a_{y3} \cdot t_3^2\right)\right)^2} \\ \sqrt{\left(x_2 - v_{x2} \cdot t_2 - \frac{1}{2}a_{x2} \cdot t_2^2 - \left(x_3 - v_{x3} \cdot t_3 - \frac{1}{2}a_{x3} \cdot t_3^2\right)\right)^2 + \left(y_2 - v_{y2} \cdot t_2 - \frac{1}{2}a_{y2} \cdot t_2^2 - \left(y_3 - v_{y3} \cdot t_3 - \frac{1}{2}a_{y3} \cdot t_3^2\right)\right)^2} \end{bmatrix}$$

$$e = \begin{bmatrix} \tilde{R}_{02} - \sqrt{\left(\left(X_0 - v_{x0} \cdot t_0 - \frac{1}{2}a_{xo} \cdot t_0^2 - \right) \atop \left(x_2 - v_{x2} \cdot t_2 - \frac{1}{2}a_{x2} \cdot t_2^2\right)\right)^2 + \left(\left(Y_0 - v_{y0} \cdot t_0 - \frac{1}{2}a_{yo} \cdot t_0^2 - \right) \atop \left(y_2 - v_{y2} \cdot t_2 - \frac{1}{2}a_{y2} \cdot t_2^2\right)\right)^2} \\ \tilde{R}_{03} - \sqrt{\left(\left(X_0 - v_{x0} \cdot t_0 - \frac{1}{2}a_{xo} \cdot t_0^2 - \right) \atop \left(x_3 - v_{x3} \cdot t_3 - \frac{1}{2}a_{x3} \cdot t_3^2\right)\right)^2 + \left(\left(Y_0 - v_{y0} \cdot t_0 - \frac{1}{2}a_{yo} \cdot t_0^2 - \right) \atop \left(y_3 - v_{y3} \cdot t_3 - \frac{1}{2}a_{y3} \cdot t_3^2\right)\right)^2} \\ \tilde{R}_{12} - \sqrt{\left(\left(X_1 - v_{x1} \cdot t_1 - \frac{1}{2}a_{x1} \cdot t_1^2 - \right) \atop \left(x_2 - v_{x2} \cdot t_2 - \frac{1}{2}a_{x2} \cdot t_2^2\right)\right)^2 + \left(\left(Y_1 - v_{y1} \cdot t_1 - \frac{1}{2}a_{y1} \cdot t_1^2 - \right) \atop \left(y_2 - v_{y2} \cdot t_2 - \frac{1}{2}a_{y2} \cdot t_2^2\right)\right)^2} \\ \tilde{R}_{13} - \sqrt{\left(\left(X_1 - v_{x1} \cdot t_1 - \frac{1}{2}a_{x1} \cdot t_1^2 - \right) \atop \left(x_3 - v_{x3} \cdot t_3 - \frac{1}{2}a_{x3} \cdot t_3^2\right)\right)^2 + \left(\left(y_1 - v_{y1} \cdot t_1 - \frac{1}{2}a_{y1} \cdot t_1^2 - \right) \atop \left(y_3 - v_{y3} \cdot t_3 - \frac{1}{2}a_{y3} \cdot t_3^2\right)\right)^2} \\ \tilde{R}_{23} - \sqrt{\left(\left(x_2 - v_{x2} \cdot t_2 - \frac{1}{2}a_{x2} \cdot t_2^2 - \right) \atop \left(x_3 - v_{x3} \cdot t_3 - \frac{1}{2}a_{x3} \cdot t_3^2\right)\right)^2 + \left(\left(y_2 - v_{y2} \cdot t_2 - \frac{1}{2}a_{y2} \cdot t_2^2 - \right) \atop \left(y_3 - v_{y3} \cdot t_3 - \frac{1}{2}a_{y3} \cdot t_3^2\right)\right)^2} \end{bmatrix}$$

Note that the above velocities and accelerations can be obtained from the Doppler shift technique, the RU's onboard speedometer and compass, or inertial sensors. FIG. 11 is an example of the message identifiers and the format of position data used in probe/U-probe messages in a preferred embodiment of the present invention.

Figure 8:
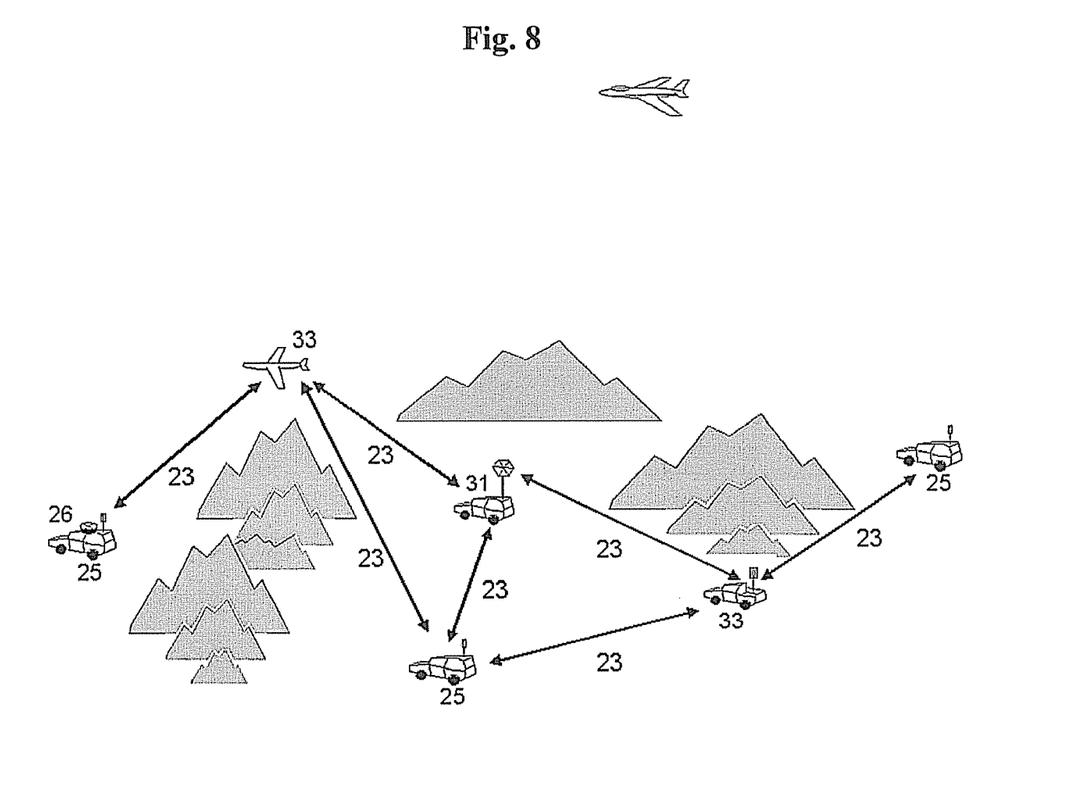
FIG. 8 is a diagram illustrating a mobile MLAT configuration using relay units in one embodiment of the present invention.

Referring to FIG. 8, in the case of sparse RU 25 distribution, relay stations 33 can be deployed for the purpose of bridging regions with insufficient coverage and maintain reliable multi-hop communications by receiving and retransmitting network messages through the relay stations. Such relay stations 33 are essential where the apparatus of the present invention is subject to communications failures due to terrain or dense vegetation blockages, for example. Like RUs 25, relay stations 33 are mobile surface or air units, but relay stations 33 do not receive signals transmitted by emitters external to the network, such as target emissions. For applications where multi-hop communications are not preferable or feasible, satellite or microwave links may be established to maintain communications.

For each relay station 33, its main functionality is to relay communication signals, thus only one receiving/transmitting module is required. While a relay station 33 does not receive emitter signals and does not produce any signal measurements like an RU 25, the communications between relay stations 33 and RUs 25 may be utilized for RU 25 location and time synchronization. Note that a relay station 33 or a central processor 26 may be granted with the same probing and U-probing capabilities as that of a RU 25 and the ability to perform probing and U-probing implies the ability to timestamp messages as well.

FIG. 8 also shows a situation where the location of the target relative to the RUs 25 is all that is desired (i.e., the absolute, earth coordinate position of the target is not necessary). In this case, the RUs 25 determine their relative location with respect to the other RUs 25 and/or relay stations 33 forming the MLAT sensor constellation 24. By determining the relative location of each of the RUs 25 and/or relay stations 33 in the MLAT sensor constellation 24, the central processor 26 can multilaterate a relative location for a target with respect to the MLAT sensor constellation 24. This relative position determination capability is useful where GPS satellite data is unavailable, due to satellite unavailability, GPS data corruption or reception interference. The relative position determination is also useful for situations where the GPS receiver equipment is not installed or is inoperable.

While the present invention has been particularly shown and described with reference to preferred embodiments, it will be understood by one skilled in the art that various changes in detail may be effected therein without departing from the spirit and scope of the invention as defined by the claims.

What is claimed:

1. A method of time synchronizing a plurality of receiving units in a multilateration system, comprising the steps of:
   forming a communications network between the plurality of receiving units, the communications network supplying data between receiving units and a central processor;
   transmitting a message from a first receiving unit to at least one other receiving unit to initiate time synchronization between a clock in the first receiving unit and clocks in the at least one other receiving unit;
   receiving, at the first receiving unit, a response message from the at least one other receiving unit; and
   transmitting a reply message from the first receiving unit to the at least one other receiving unit, wherein the reply message contains at least one of (i) a time of receipt of the response message at the first receiving unit, and (ii) a time of transmission of the reply message from the first receiving unit, whereby the at least one other receiving unit uses the messages from the first receiving unit to synchronize the clock in the at least one other receiving unit to the clock in the first receiving unit.

2. The method of claim 1, wherein at least one of the messages contains a time quality indicator, and said method further comprises the step of determining which receiving unit has the clock with the highest quality indicator.

3. The method of claim 1, wherein the reply message contains the time of receipt of the response message at the first receiving unit and the time of transmission of the reply message from the first receiving unit.

4. The method of claim 1, wherein, after the clock in said at least one other receiving unit is synchronized to the clock in the first receiving unit, the steps are repeated for yet another receiving unit with respect to said at least one other receiving unit.

5. The method of claim 1, wherein at least one of the receiving units includes at least one sensor for detecting a physical condition of the receiving unit.

6. The method of claim 5, wherein said sensor is at least one of a speedometer, compass, accelerometer, gyroscope and altimeter.

7. A method of time synchronizing a plurality of receiving units in a multilateration system comprising the steps of:
   forming a communications network between the plurality of receiving units, the communications network supplying data between the receiving units and a central processor;
   transmitting a message from a second receiving unit to a first receiving unit;
   receiving, at the second receiving unit, a reply message from the first receiving unit, wherein the reply message contains at least one of (i) a time of receipt of the message at the first receiving unit, and (ii) a time of transmission of the reply message from the first receiving unit, whereby the second receiving unit uses the reply message from the first receiving unit to synchronize a clock in the second receiving unit with a clock in the first receiving unit.

8. The method of claim 7, further comprising the step of determining whether the clock in the first receiving unit is of a higher quality than the clock in the second receiving unit before synchronizing the clock in the second receiving unit to the clock in the first receiving unit.

9. The method of claim 7, wherein the reply message contains the time of receipt of the message at the first receiving unit and the time of transmission of the reply message from the first receiving unit.

10. The method of claim 7, wherein, after the clock in the second receiving unit is synchronized to the clock in the first receiving unit, the steps are repeated for a third receiving unit with respect to the second receiving unit.

11. The method of claim 7, wherein at least one of the receiving units includes at least one sensor for detecting a physical condition of the receiving unit.

12. The method of claim 11, wherein said sensor is at least one of a speedometer, compass, accelerometer, gyroscope and altimeter.

* * * * *